United States Patent
Uen et al.

(10) Patent No.: US 6,879,299 B1
(45) Date of Patent: Apr. 12, 2005

(54) INDUCTION ANTENNA LOOP FOR LOW-LEVEL DIGITAL TABLETS

(75) Inventors: Tzong Wei Uen, Miao Li (TW); Shun Bin Lin, Zhang Hua Hsien (TW)

(73) Assignee: UC-Logic Technology Corp., Taipei Hsien (TW)

( * ) Notice: Subject to any disclaimer, the term of this patent is extended or adjusted under 35 U.S.C. 154(b) by 0 days.

(21) Appl. No.: 10/685,841

(22) Filed: Oct. 15, 2003

(51) Int. Cl.$^7$ ............................................... H01Q 21/00
(52) U.S. Cl. ..................... 343/866; 343/742; 343/732; 343/867; 178/18.01
(58) Field of Search ................................ 343/741, 732, 343/742, 866, 867, 895, 876; 178/18.01, 19.01

(56) References Cited

U.S. PATENT DOCUMENTS

| | | | | |
|---|---|---|---|---|
| 5,103,234 A | * | 4/1992 | Watkins et al. | ............. 343/742 |
| 6,606,068 B1 | * | 8/2003 | Chao et al. | ................. 343/742 |
| 6,787,715 B2 | * | 9/2004 | Chao et al. | .............. 178/18.01 |
| 2003/0206142 A1 | * | 11/2003 | Yeh | ............................ 343/867 |

* cited by examiner

Primary Examiner—Tan Ho
(74) Attorney, Agent, or Firm—Leong C. Lei

(57) ABSTRACT

The present invention provides an antenna loop and its layout for low-level digital tablets. The antenna loop for low-level digital tablets in the present invention consists of enameled wire; the layout comprises a single antenna loop consisting of enameled wire. Each antenna loop comprises a plurality of close circles. Furthermore, the circles of odd ordinal numbers comprise odd sections, for instance, the third circle comprises three sections; the circles of even ordinal numbers comprise even sections, for instance, the fourth circle comprises four sections; each section comprises induction areas of substantially the same size. Furthermore, the final section is an open section so that through which the second terminal of the enameled wire loop can stretch out and electrically couple with the ground wire.

14 Claims, 2 Drawing Sheets

INDUCTION ANTENNA LOOP FOR LOW-LEVEL DIGITAL TABLETS

BACKGROUND OF THE INVENTION

1. Field of the Invention

The present invention relates generally to the antenna loops in digital tablets, and more particularly, to a layout for antenna loops in digital tablets.

2. Description of the Prior Art

Usually, a handwriting recognition system is a device with electromagnetic-induction. Conventional electromagnetic-induction devices comprise, an electromagnetic pen and a tablet. There is an oscillating circuit that consists of LC in the electromagnetic pen. If the pen point is touched, the amount of inductance will be changed, which results in a variation of oscillating frequency. The amount of inductance is increased when touching the pen point and increasing pressure so the variation of oscillating frequency is also increased. Therefore, the variation of the pressure on the pen point can be detected by way of the variation of oscillating frequency. There are two switches on the sidewall of the electromagnetic pen, the emitted frequency of the electromagnetic pen can be changed with the capacitance variation of the LC device that is produced by pushing down or setting free the switches. Furthermore, the tablet comprises a detector, an amplifier and an analog-digital converter. In the conventional tablet, there is a detected loop in the center region of the tablet, with antenna loops located on the double faces of the detecting loop, wherein the antenna loops are equidistantly arranged in order by using an array. The main purpose of the detecting loop is only applied to receive the electromagnetic wave that is emitted by the electromagnetic pen. When the electromagnetic pen emits the electromagnetic wave, the antenna loops receive the electromagnetic wave, and then the tablet can obtain correlative information by the electromagnetic induction.

In general, antenna loops and layout thereof in the conventional electromagnetic-induction device arranges antennas as check network that are distributed with equidistance in the X-direction and Y-direction of two-dimensional Cartesian coordinates to induce the electromagnetic pen and calculate the absolute position thereof. Referring to FIG. 1, it shows a layout for antenna loops distributed in the X-direction of two-dimensional Cartesian coordinates, wherein one terminal of each of the antenna loops 110A is connected to each switch (X1 to X6), whereby the reduced signal of each of the antenna loops 110A can be detected by controlling the switches X1 to X6). Because of the inverse proportion of the magnetic fields intensity to the square of distance, the electromagnetic pen that emits an electromagnetic wave is at a distance from the tablet, resulting in a weak induced signal received by antenna loops. On the contrary, the induced signal that is received by antenna loops has an increased number of intensity when the electromagnetic pen approaches the tablet. Therefore, the CPU of the tablet scans one by one and in turn each of the antenna loops to analyze intensity of induced signals that are received by each antenna loops, so as to detect the position where the cordless pen is located and calculate the coordinates thereof.

However, there is an increasing number of antenna loops in the tablet having a much larger area so a great amount of antenna switches are necessary. In a conventional method, it is necessary to notice that the distance between two adjacent logical sections in the same physical antenna loop must be adequate. If the distance is too small, it is possible to make a mis-judgment in deciding the position of the electromagnetic pen. On the other hand, nowadays, digital products are developed toward the aspect of high speeds for processing information, which is a result of electromagnetic interference. Generally, there are various digital products around the specific place for using the digital tablet. In terms of the digital tablets with bigger areas that are commercially required, the amount of switches and antenna loops in the digitizer tablets of the prior art is increased accordingly. Therefore, the method that increases amount of n-shaped sections in the same antenna loop is provided to decrease a great amount of antenna switches. Here the method increases length of the antenna loop so as to generate electromagnetic noise, that is, it is easy to be interfer with the electromagnetic noise, and that affects the calculation of the position of the pen that is located on the digital tablet. Furthermore, conventional layouts of antenna loops set limitations on scaling down the area of handwriting tablets, which results in difficulty in manufacturing panels with small boundary regions. Conventional layouts of antenna loops are formed on Printed Circuit Boards (PCB) through various semiconductor manufacturing processes (such as lithography and etch), for products with low need for high delicacy for layouts of antenna loops, such as children scribbling panels, audible books, . . . etc, although conventional layouts of antenna loops formed by the printed circuit boards process are advantageous in position detection, the cost is too high. In accordance with the above description, a new layout for multi-antenna loops in the digital tablet is therefore necessary, so as to solve the problems mentioned from the foregoing description.

SUMMARY OF THE INVENTION

In accordance with the present invention, a new layout for antenna loops in digital tablets is provided, which substantially overcomes the drawbacks of above problems mentioned from the conventional systems.

It is an object of the present invention to provide a layout for antenna loops in low-level digital tablets. The present invention is an induction antenna loop formed by an enameled wire loop instead of conventional PCB, and an electromagnetic induction interface is formed by circular arrangements of the enameled wire loop. The enameled wire process of antenna loops used in the present invention needs not delicate equipment, which reduces the cost and complexity of the manufacturing process. Furthermore, another object of the present invention is to provide an antenna loop used for low-level digital tablets. The present invention can form the layout of an antenna loop with single enameled wire loop, wherein the single enameled wire loop is used to form a coordinate with a plurality of sections. This method is served to replace the conventional multi-antenna layout and reduce the number of switches. Therefore, the present invention corresponds to economic effect and utilization in industry.

Accordingly, it is an object of the present invention to provide a layout for antenna loops in low-level digital tablets. The material used in the present invention is enameled wire, and the layout comprises: locating single antenna loop formed by enameled wire along each axis, wherein the first terminals of each single antenna loop located along each axis are electrically coupled with an antenna switch, and the second terminals are electrically connected with a ground wire. Each of the antenna loops has a plurality of sections formed by circularly arranging the enameled wire; the enameled wire circles connect to each other orderly so that all the starting-terminals of each circle assemble in the starting-area of the whole enameled wire loop, wherein the starting-area of the whole enameled loop is an area into which the first terminal of the enameled wire loop electrically coupled with the antenna switch stretch. Furthermore, the circles of odd ordinal numbers comprise odd sections, for instance, the third circle comprises three sections; the circles of even ordinal numbers comprise even sections, for instance, the fourth circle comprises four sections. The final section is an open section so that through which the second terminal of the enameled wire loop can stretch out and electrically couple with the ground wire.

DESCRIPTION OF THE PREFERRED EMBODIMENT

The present invention is related to a layout for antenna loops in low-level digital tablets. Preferred embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

Figure 1:
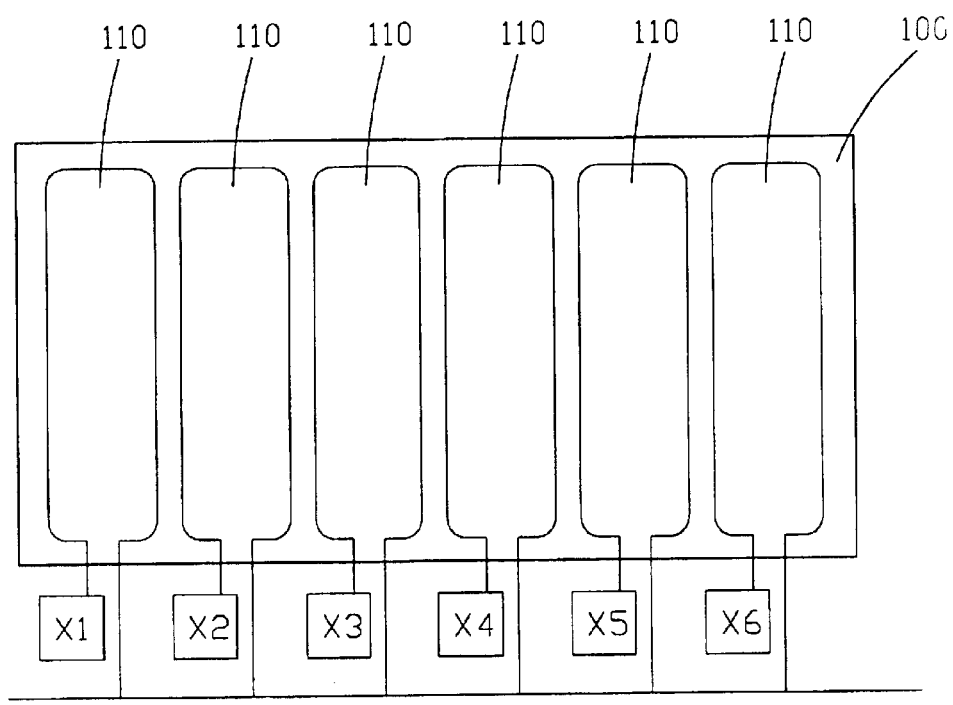
FIG. 1 is a schematic diagram illustrating the prior art in the layout for antennas loop in digital tablets.
Figure 2:
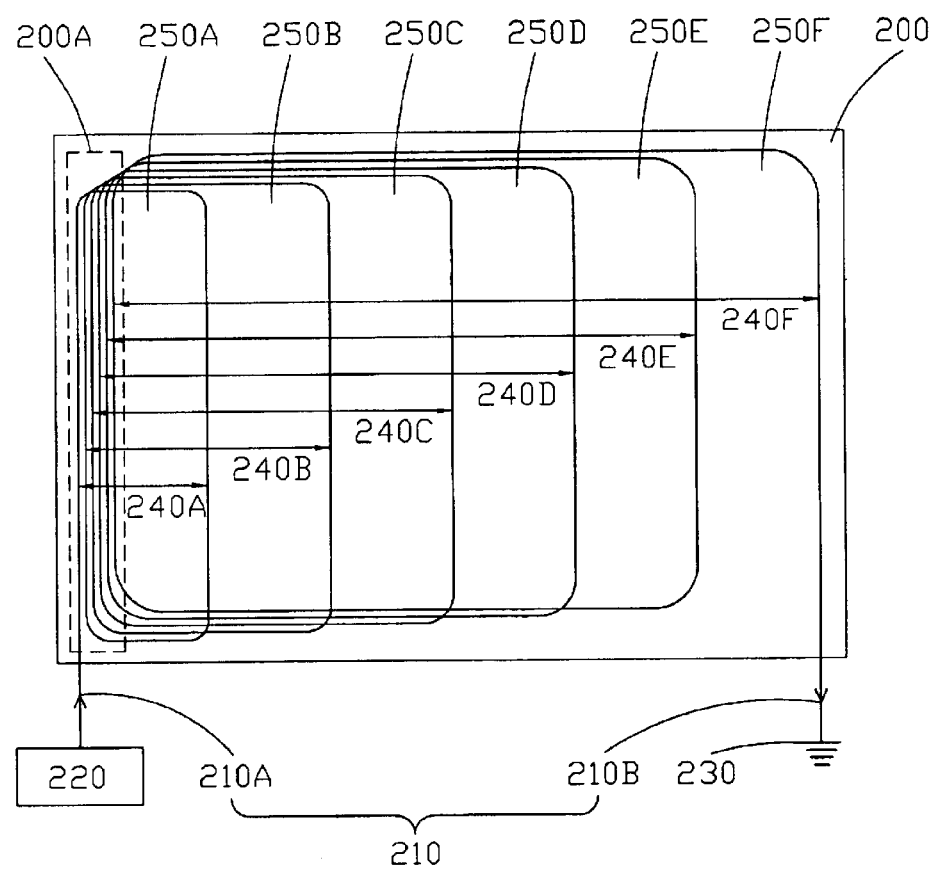
FIG. 2 is a schematic diagram illustrating the layout for an antenna loop for low-level digital tablet constructed in accordance with one preferred embodiment of the present invention.

Reference is now made to FIG. 2, in one embodiment of the present invention, an electromagnetic-induction area 200 comprising a single antenna loop 210 located along each axis is provide; the single antenna loop 210 consists of enameled wire, and comprises a first terminal 210A electrically coupled with an antenna switch 220, and a second terminal 210B electrically connected with a ground wire 230. Each antenna loop 210 comprises a plurality of circles 240 formed by circularly arranging the enameled wire loop, and the circles 240 connect to each other orderly so that all the starting-terminals of each circle 240 assemble in the starting-area 200A of the whole enameled wire loop on the same side of the electromagnetic-induction area 200, wherein the starting-area 200A of the whole enameled loop is an area into which the first terminal 210A of the enameled wire loop electrically coupled with antenna switch 220 stretch. The plurality of circles 240 divide the whole electromagnetic-induction area 200 into a plurality of sections 250 that serve as a plurality of electromagnetic-induction addresses. The circles 240A, 240C and 240E of odd ordinal numbers comprise odd sections, for instance, the third circle 240C comprises three sections 250A, 250B and 250C; the circles 240B, 240D and 240F of even ordinal numbers comprise even sections, for instance, the fourth circle 240D comprises four sections 250A, 250B, 250C and 250D; the induction areas of each section 250A–E are of substantially the same sizes. Furthermore, sections 250A–E are close area, but the final section 250F is an open area so that through which the second terminal 2101B of the enameled wire loop can stretch out and electrically couple with the ground wire 230. Furthermore, the profile of the plurality of circles 240 from the single antenna loop 210 can be formed with various shapes, such as circle-shaped, elliptic-shaped, square-shaped, rectangle-shaped . . . etc.

As mentioned above, the present invention is an induction antenna loop formed by an enameled wire loop instead of conventional PCB, and an electromagnetic induction interface is formed by circularly arranging the enameled wire loop. The enameled wire process of the antenna loop used in the present invention needs not delicate equipment, which reduce the cost and complexity of the manufacturing process. Furthermore, another object of the present invention is to provide an antenna loop for low-level digital tablets. The present invention can form the layout of an antenna loop with single enameled wire loop, wherein the single enameled wire loop is used to form a coordinate with a plurality of sections. This method is served to replace the conventional multi-antenna layout and reduce the number of switches. Therefore, the present invention corresponds to economic effect and utilization in industry.

Of course, it is possible to apply the present invention to the antenna loops in the digital tablets, and to any apparatus with layout of antenna loops.

Obviously, many modifications and variations of the present invention are possible in light of the above teachings. It is therefore to be understood that within the scope of the appended claims, the present invention may be practiced otherwise than as specifically described herein. Although specific embodiments have been illustrated and described, it will be obvious to those skilled in the art that various modifications may be made without departing from what is intended to be limited solely by the appended claims.

What is claimed is:

1. An induction antenna loop for low-level digital tablet, said induction antenna loop comprising:
   an electromagnetic-induction area; and
   an antenna loop having a plurality of circles in the form of multi-circularly arrangements, said circles connect to each other orderly to make the starting terminals of said plurality of circles on the same side of said electromagnetic-induction area, and said plurality of circles divide said electromagnetic area into a plurality of sections that serve as a plurality of electromagnetic-induction addresses.

2. The induction antenna loop for low-level digital tablet of claim 1, wherein said antenna loop is located in said electromagnetic-induction area along each axis.

3. The induction antenna loop for low-level digital tablet of claim 1, wherein the material of said antenna loop is an enameled wire.

4. The induction antenna loop for low-level digital tablet of claim 1, wherein the first terminal of said antenna loop is electrically coupled with an antenna switch.

5. The induction antenna loop for low-level digital tablet of claim 1, wherein the second terminal of said antenna loop is electrically connected with a ground wire.

6. The induction antenna loop for low-level digital tablet of claim 1, wherein said circles of odd ordinal number comprise odd said sections, and said circles of even ordinal number comprise even said sections.

7. The induction antenna loop for low-level digital tablet of claim 1, wherein said plurality of sections comprise induction areas of substantially the same size.

8. The induction antenna loop for low-level digital tablet of claim 1, wherein all but the final one of said plurality of sections are close sections, and the final one of said plurality of sections is an open area so that through which said antenna loop can stretch out and electrically couple with said ground wire.

9. An induction antenna loop for low-level digital tablets comprising:
   an electromagnetic-induction area; and
   an antenna loop consisting of enameled wire, said antenna loop comprises a plurality of circles in the form of multi-circular arrangements, and said circles connect to each other orderly so that the starting terminals of said plurality of circles are located on the same side of said electromagnetic-induction area, and said plurality of circles divide said electromagnetic area into a plurality of sections that serve as a plurality of electromagnetic-induction addresses, further, said circles of odd ordinal number comprises odd said sections and said circles of even ordinal number comprises even said sections.

10. The induction antenna loop for low-level digital tablet of claim 9, wherein said antenna loop is located in the electromagnetic area along each axis.

11. The induction antenna loop for low-level digital tablet of claim 9, wherein the first terminal of said antenna loop is electrically coupled with an antenna switch.

12. The induction antenna loop for low-level digital tablet of claim 9, wherein the second terminal of said antenna loop is electrically connected with said ground wire.

13. The induction antenna loop for low-level digital tablet of claim 9, wherein said plurality of sections comprise induction areas of substantially the same size.

14. The induction antenna loop for low-level digital tablet of claim 9, wherein all but the final one of said plurality of sections are close sections, and the final one of said plurality of sections is an open area so that through which said antenna loop can stretch out and electrically couple with said ground wire.

* * * * *